(12) United States Patent
Levi et al.

(10) Patent No.: US 8,991,889 B1
(45) Date of Patent: Mar. 31, 2015

(54) WORK VEHICLE WITH INTEGRATED LADDER RACK

(71) Applicants: Avraham Y. Levi, Eagan, MN (US); Francois Boisvert, St-Julie (CA)

(72) Inventors: Avraham Y. Levi, Eagan, MN (US); Francois Boisvert, St-Julie (CA)

( * ) Notice: Subject to any disclaimer, the term of this patent is extended or adjusted under 35 U.S.C. 154(b) by 0 days.

(21) Appl. No.: 14/068,958

(22) Filed: Oct. 31, 2013

(51) Int. Cl.
*B60R 9/00* (2006.01)
*B60P 1/48* (2006.01)
*B60R 9/042* (2006.01)

(52) U.S. Cl.
CPC .............. *B60R 9/0423* (2013.01); *B60P 1/486* (2013.01)
USPC ................ 296/3; 296/210; 224/310; 414/462

(58) Field of Classification Search
USPC ......................... 296/3, 210; 224/310; 414/462
See application file for complete search history.

(56) References Cited

U.S. PATENT DOCUMENTS

| | | | |
|---|---|---|---|
| 3,058,607 A | 10/1962 | Kiley | |
| 4,170,331 A | 10/1979 | Faulstich | |
| 4,932,717 A | 6/1990 | Swann | |
| 5,398,778 A | 3/1995 | Sexton | |
| 5,597,103 A | 1/1997 | Nichols | |
| 6,029,873 A * | 2/2000 | Won et al. | 224/321 |
| 6,764,268 B2 | 7/2004 | Levi | |
| 6,769,728 B2 | 8/2004 | Albaisa et al. | |
| 8,167,179 B2 * | 5/2012 | Thomas et al. | 224/321 |
| 2002/0090285 A1 | 7/2002 | Levi | |
| 2007/0080185 A1 * | 4/2007 | Czornyj | 224/310 |
| 2009/0001770 A1 * | 1/2009 | Baccelli | 296/210 |

* cited by examiner

*Primary Examiner* — Jason S Morrow
(74) *Attorney, Agent, or Firm* — Nikolai & Mersereau, P.A.; Thomas J. Nickolai

(57) ABSTRACT

An ergonomic ladder rack assembly mounted on the roof of a topper for a pick-up truck bed or on the roof of a cargo van, the topper having a ladder rack assembly mounted thereon, the ladder rack assembly designed to lift, move and return a ladder load between a stowed position atop the roof of the topper or van and a deployed position alongside of the vehicle. The roof of the topper or van has recessed areas formed therein for containing components of the ladder rack to thereby lower the height profile of the combination.

8 Claims, 7 Drawing Sheets

WORK VEHICLE WITH INTEGRATED LADDER RACK

CROSS REFERENCE TO RELATED APPLICATIONS

None

GOVERNMENT OWNERSHIP RIGHTS

None

BACKGROUND OF THE INVENTION

1. Field of the Invention

This invention relates generally to truck and van vehicles, and more particularly to pickup trucks with toppers or inserts and cargo vans used for transporting cargo and ladders to work sites.

2. Discussion of the Prior Art

Pickup trucks used as work vehicles typically comprise a cargo bed and a cab. Owners may typically install a topper unit on the cargo bed where the topper unit typically comprises a molded fiberglass structure having a front wall adjacent the cab, a rear wall adjacent a tailgate and with sidewalls extending between the front and rear walls. A roof of the topper unit covers the space defined by the front, rear and sidewalls. In some instances, the height of the topper unit matches the height of the cab but there are topper designs where the height of the topper exceeds the height of the cab. The topper will typically have doors in the side and rear walls to facilitate loading and unloading of cargo from the interior of the topper compartment.

A typical cargo van has a unitized passenger cab and a closed cargo compartment having a roof, left and right sidewalls and a rear wall with access doors on the sides and/or rear wall.

In many service industries, such as building construction, plumbing, communication equipment installation and the like, extension ladders are a necessary implement. Because such ladders are typically too long to fit within a pickup truck's cargo bed, they are commonly carried on a rack affixed to the roof of the topper as shown in U.S. Pat. Nos. 4,170,331 and 4,932,717. The ladders are fastened to the rack while being transported to a job site but are then manually removed from the rack and carried to the point of use.

When an ergonomic ladder rack that include a mechanism for transferring a ladder from a stowed position on the roof of the vehicle to a take-away position along the vehicle's side, such as described in applicant's earlier U.S. Pat. Nos. 6,099,231 and 6,764,268, is conventionally mounted on a pickup truck topper, as shown in FIG. 3 of the drawings or on the roof of a cargo van, the overall height of the combination may preclude the vehicle from entering many parking ramps, underground parking facilities and other buildings where the clearance height for the vehicle is limited. Accordingly, a need exists for an assembly of an ergonomic ladder rack with either a pickup vehicle with a topper or a cargo van where the overall height dimension of the assembly is reduced to a point where the vehicle can readily clear existing building structures with height restrictions.

SUMMARY OF THE INVENTION

In accordance with the present invention, a ladder rack for facilitating the loading and unloading of a ladder from a roof of a cargo van or a pickup truck equipped with a topper unit is integrated into the roof structure so as to reduce the height profile of the combination. The integration involves partially recessing the ladder rack below a major surface of the van or topper's roof. More particularly, the roof of the topper, for example, is provided with front and rear recesses proximate the front wall and rear wall of the topper, respectively. The recesses are sized to at least partially contain components comprising the ladder rack therein.

In the following detailed description of the invention, it will be explained in connection with a truck with a topper unit, but persons skilled in the art will readily see how the roof of a cargo van can be altered to accommodate an ergonomic ladder rack as well.

DESCRIPTION OF THE DRAWINGS

The foregoing features, objects and advantages of the invention will be apparent to persons skilled in the art from the following detailed description of the invention, especially when considered in light of the accompanying drawings in which like numerals in the several views refer to corresponding parts.

DETAILED DESCRIPTION OF THE PREFERRED EMBODIMENT

Figure 1:
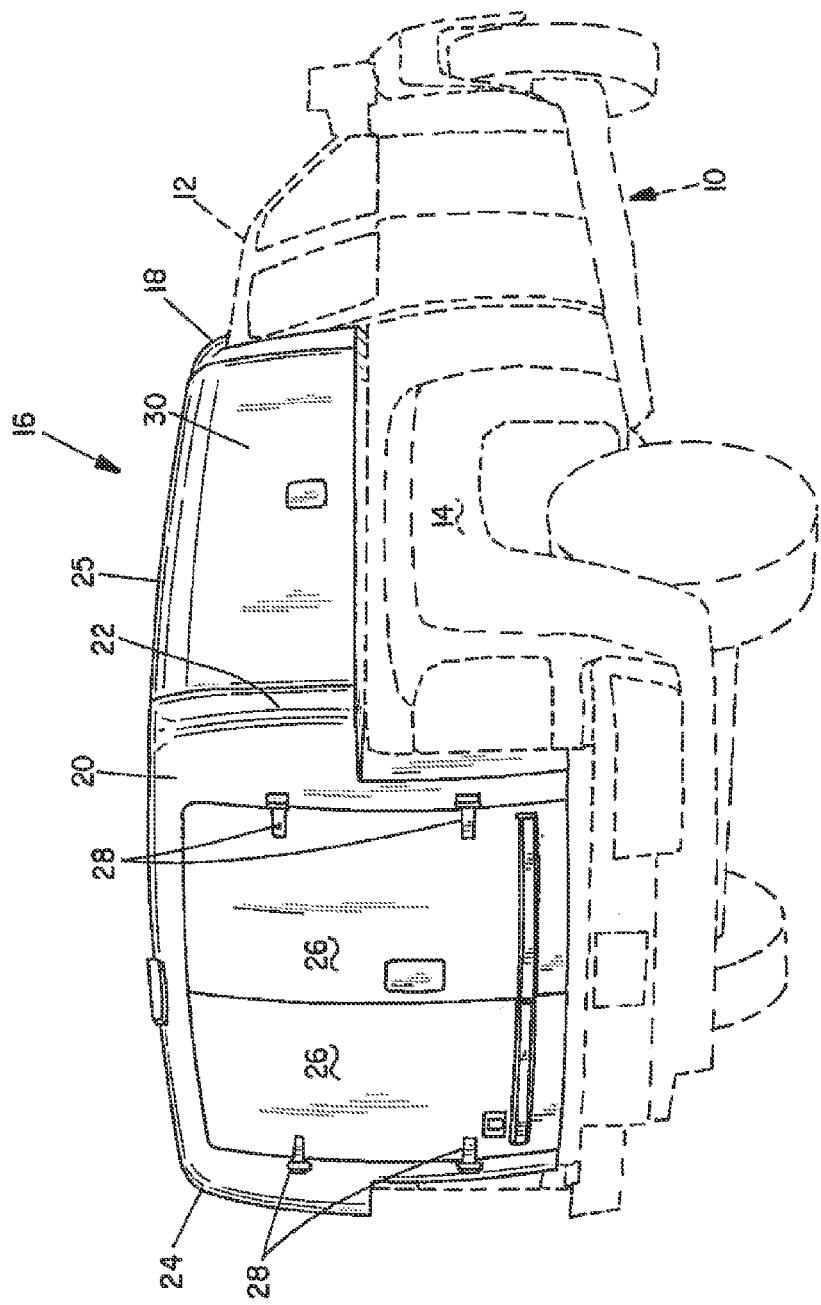
FIG. 1 is a rear/side perspective view of a pickup truck with a topper installed.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring to FIG. 1, there is shown a pickup truck work vehicle indicated generally by numeral 10 which includes a driver/passenger cab 12 and a cargo bed 14. Shown disposed in the cargo bed is a topper unit 16 having a front wall 18, a rear wall 20 and right and left side walls 22 and 24 and a roof 25. The topper unit 16 is provided with access doors 26 in the rear wall 20 which are designed to swing open about hinges 28 allowing access to the interior compartment of the topper. The topper 16 may also have swing-up access doors, as at 30, formed in the side walls 22 and 24 that are adapted to rotate about hinges (not shown) disposed proximate the roof 25 of the topper 16.

Figure 2:
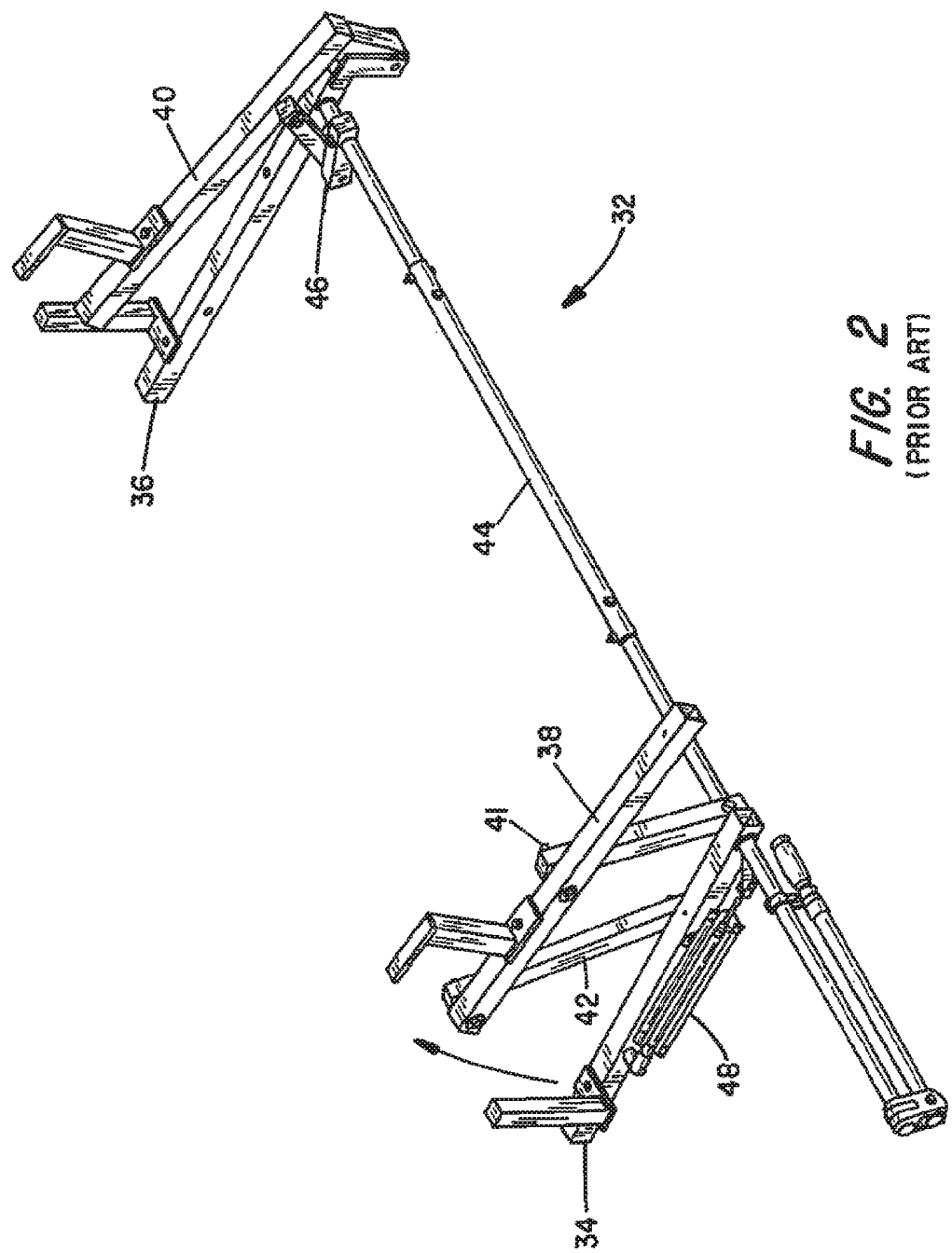
FIG. 2 is a view of a prior art ladder rack removed from a topper.

Referring next to FIG. 2, there is shown a perspective view of an ergonomic ladder rack specifically designed to aid in the transfer of a ladder load from the roof of a work vehicle to a position alongside the vehicle where a workman can readily remove the ladder from the rack and manually transport it to his/her work site.

The ladder rack is indicated generally by numeral 32 and includes as components a rear stationary member 34, a front stationary member 36, a rear ladder support member 38, a front ladder support member 40 along with connecting linkages 41 and 42. Journaled for rotation in the stationary members 34 and 36 is an elongated drive shaft 44 to which the linkage 41 is attached. Likewise, a linkage 46 is operatively coupled to the drive shaft 44 and to the ladder support member 40. A hydraulic dampener 48 has its cylinder affixed to the stationary member 34 and its piston coupled to the drive shaft 44. The ladder rack assembly 32 of FIG. 2 is the same as that described in the Levi U.S. Pat. No. 6,764,268 which is hereby incorporated by reference and that patent explains in significant detail the manner of operation of the ladder in loading and unloading ladders onto and from the roof a vehicle.

Figure 3:
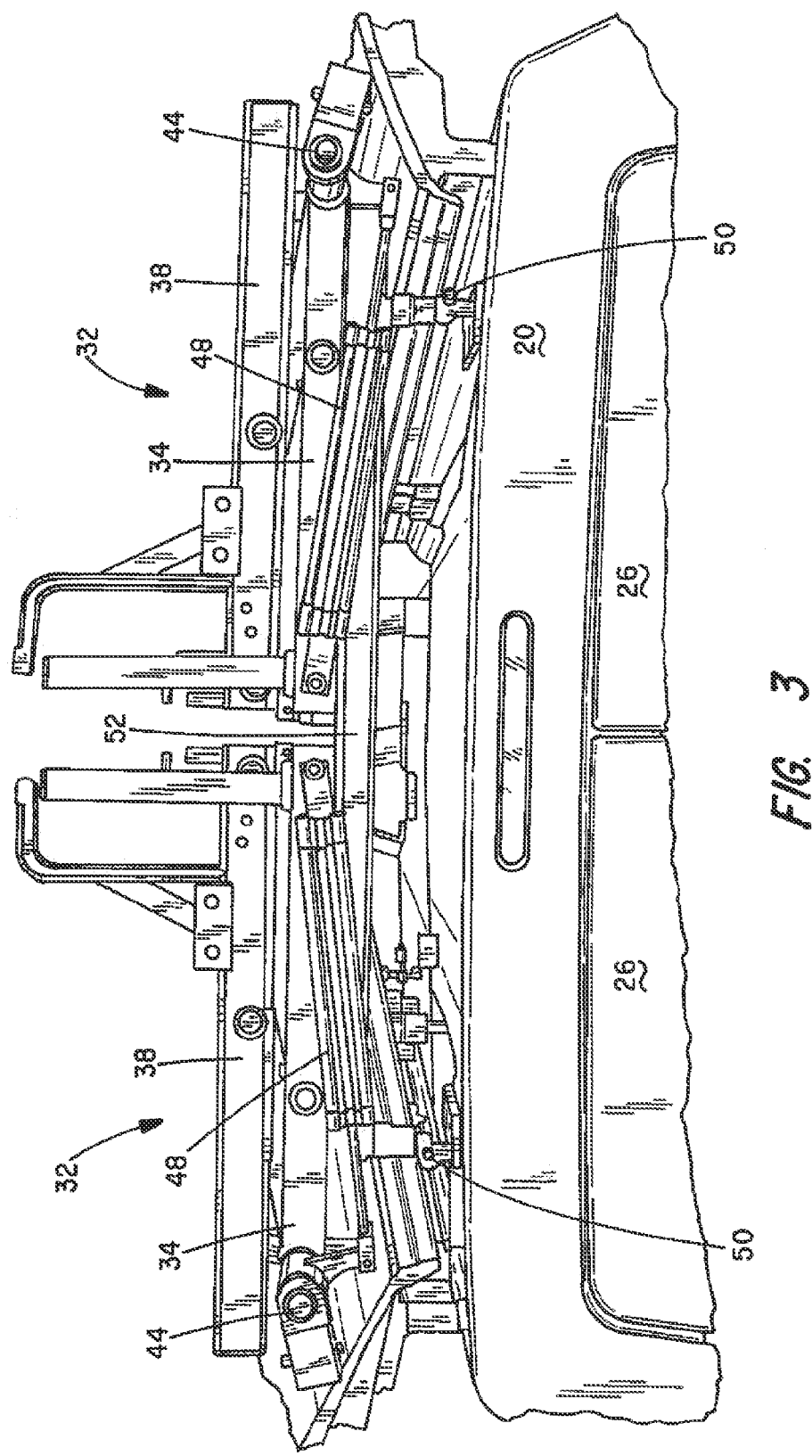
FIG. 3 is a rear view of a topper for a pickup truck having a ladder rack conventionally mounted thereon.

FIG. 3 is a rear view of a topper 16 with a pair of ladder racks 32 mounted in a conventional manner on the roof of a topper unit with one on the driver's side and one on the passenger's side. In affixing the ladder rack members 32 to the topper roof, front and rear standoff brackets 50 have their base fastened by screws to the topper's fiberglass roof. Spanning the distance between the tops of the front and rear mounting brackets 50 are elongated rails (not shown) and clamped to the rails are front and rear cross members, as at 52. The stationary members 34 and 36 on the ladder rack attach to the front and rear crossbars 52, the result being that the overall height above ground of the topper plus ladder rack is such that the ladder rack is elevated to a point where it is likely to interfere with lower clearance entrances to building structures. The present invention provides as a way of significantly reducing the overall height involved from what is shown in FIG. 3.

Figure 4:
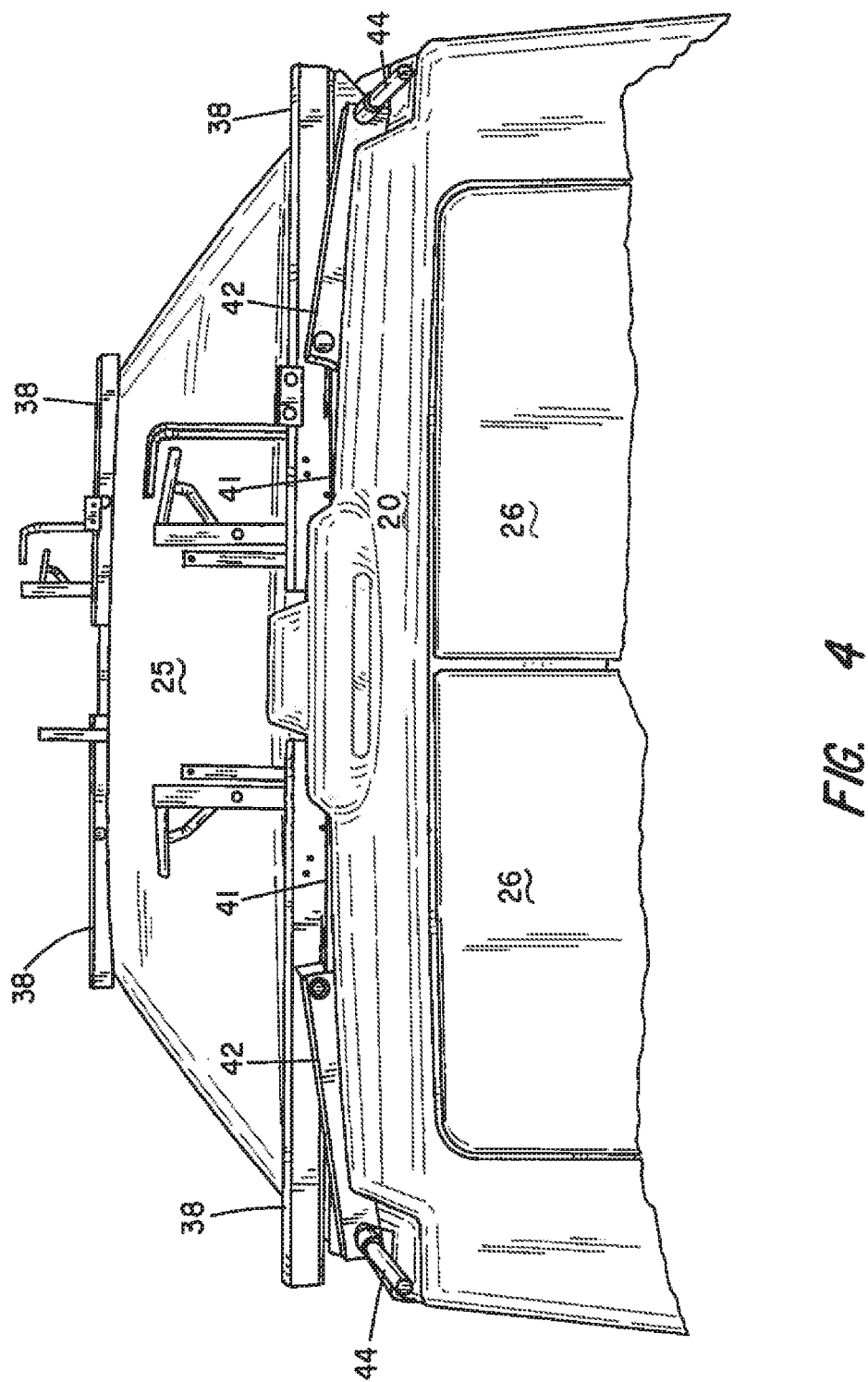
FIG. 4 is a partial rear view of a topper unit with a ladder rack integrated into the roof structure of the topper.

FIG. 4 is shown so as to be compared with the mounting arrangement of the ladder rack illustrated in FIG. 3. In the view of FIG. 4, certain components of the ladder rack are recessed below the level of the topper's roof 25. It is found that the mounting method of the present invention reduces the composite height of the topper plus ladder rack by about 10 inches.

Figure 5:
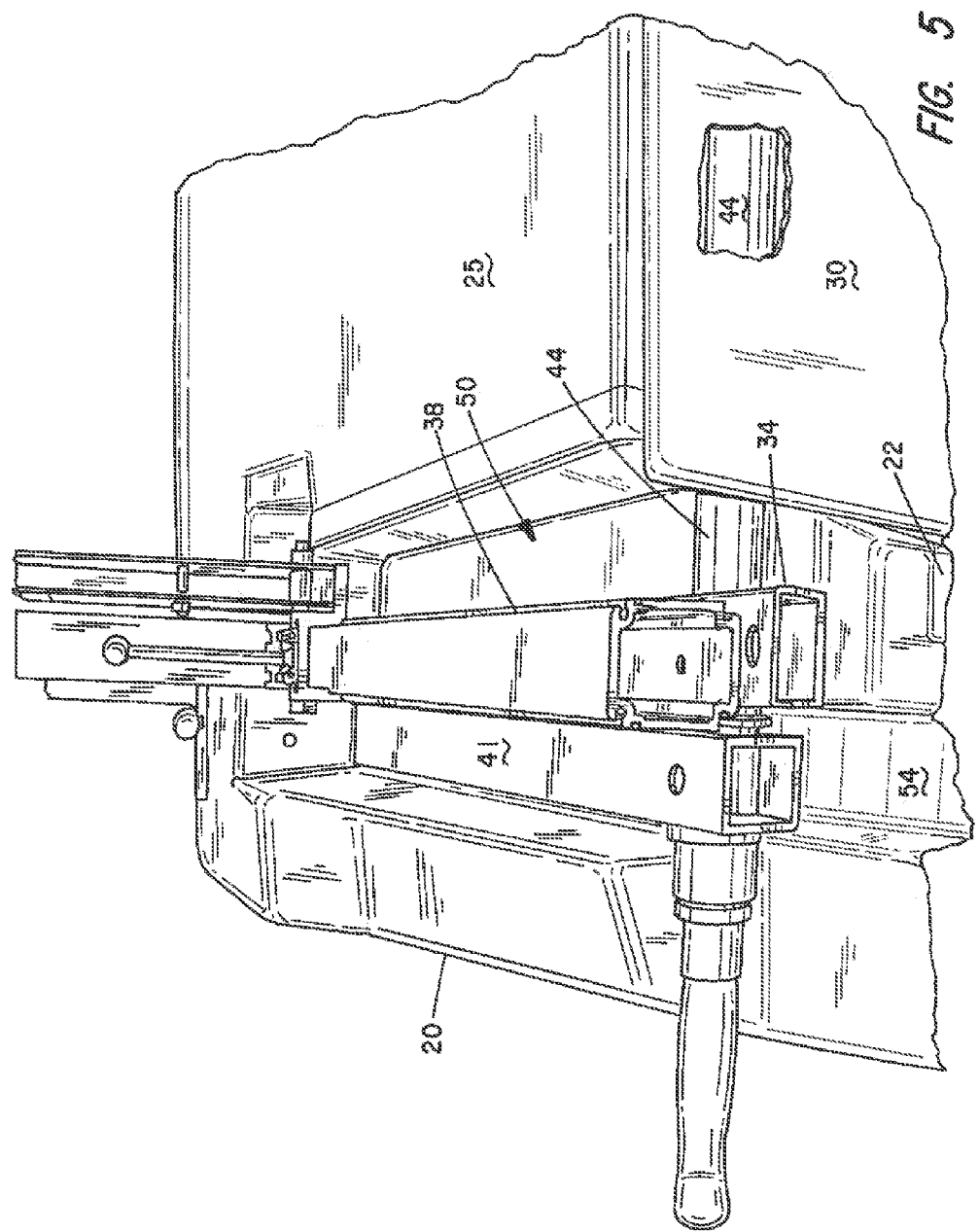
FIG. 5 is a side perspective view illustrating a rear portion of the topper's roof that has been provided with a recess for accommodating components of the ladder rack of FIG. 2.
Figure 6:
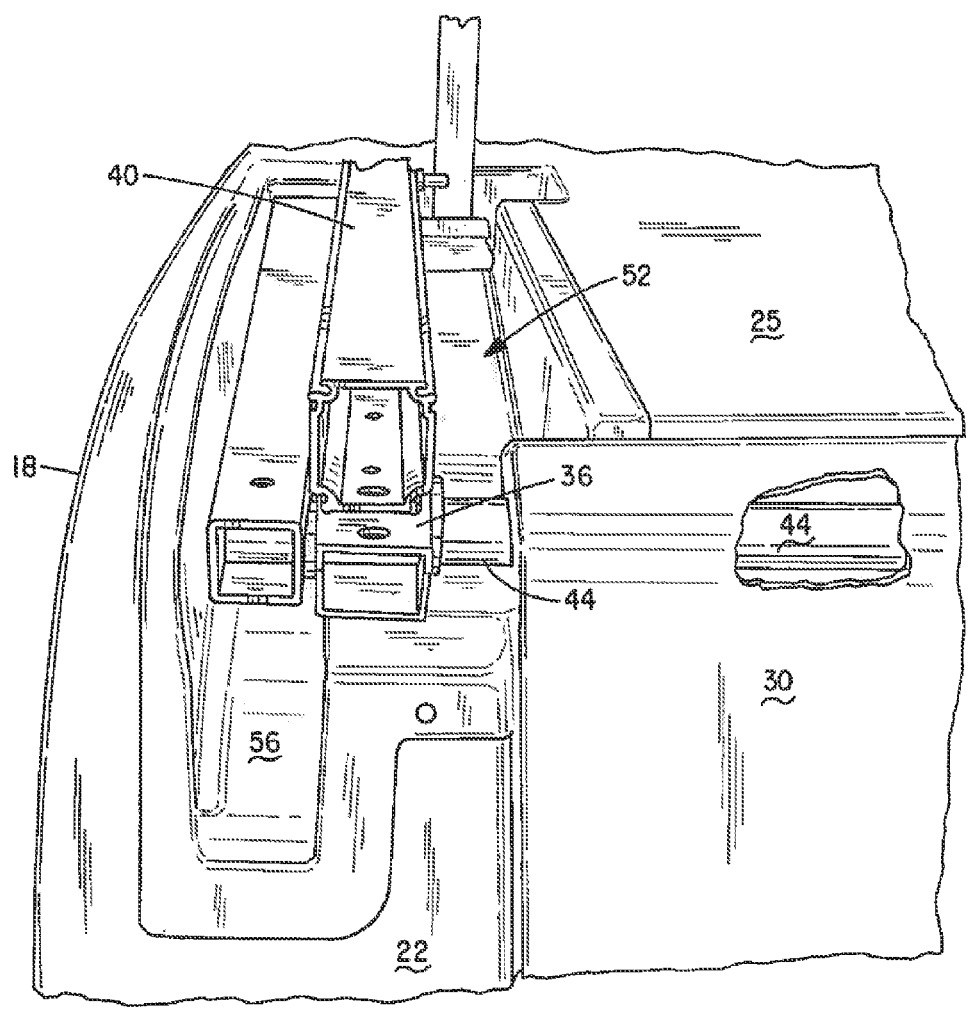
FIG. 6 is a partial side perspective view showing a front portion of a topper's roof provided with a recess for accommodating components of the ladder rack of FIG. 2.
Figure 7:
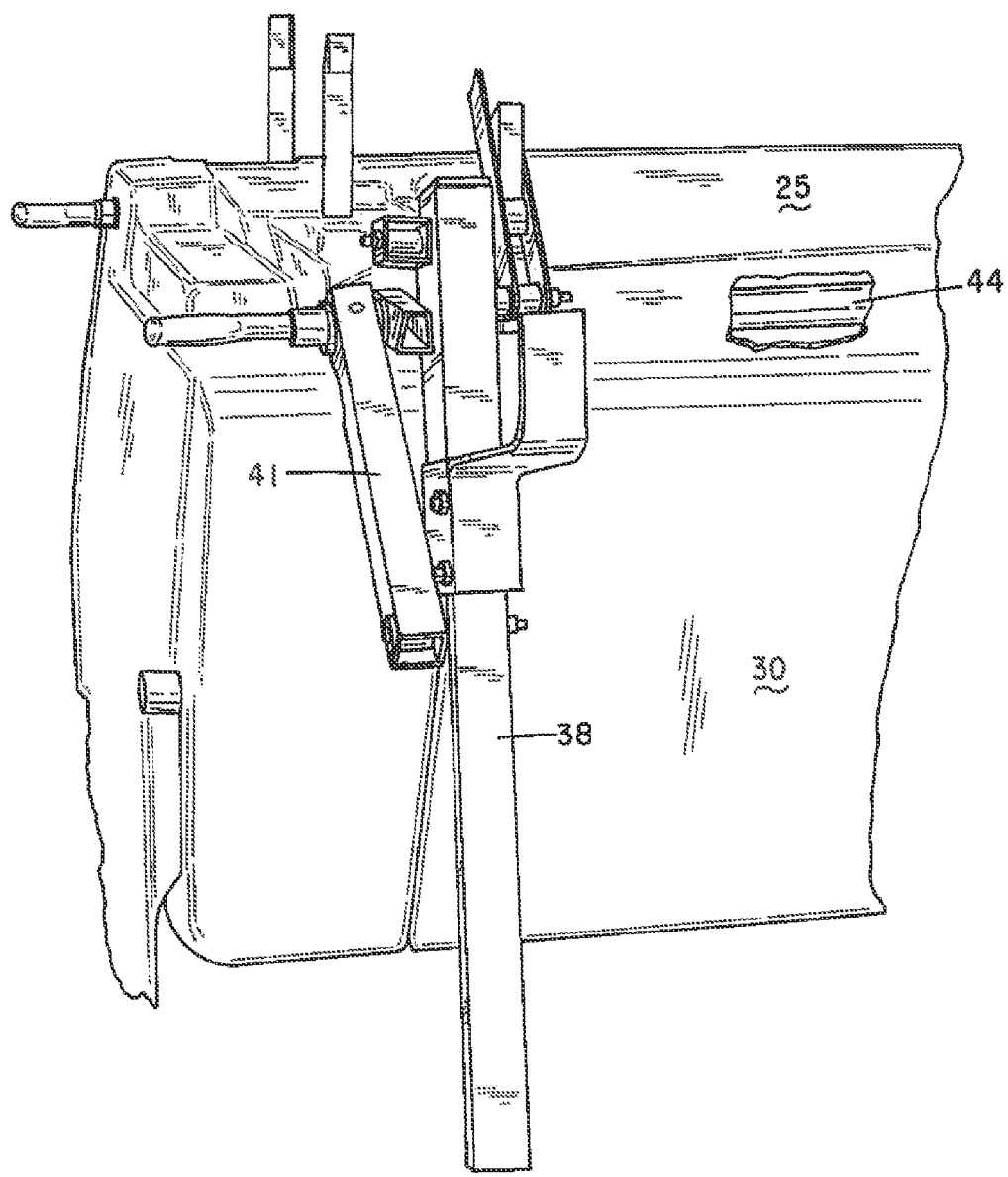
FIG. 7 is a view like that of FIG. 5, but with the ladder rack components in their ladder deploying state.

Now, with reference to FIG. 5, it shows a recess 50 formed in the roof 25 proximate the rear wall 20 of the topper. Likewise, as seen in FIG. 6, a similar recess 52 is formed in the roof 25 proximate the front wall 18 of the topper. Fitted within the recess 50 proximate the rear wall 20 are components 34, 38 and 42 of the ladder rack assembly with the linkage 42 being hidden from view in that it lies beneath the linkage 41 when the ladder rack assembly is in a position where ladders resting on members 38 and 40 are stowed atop the roof of the vehicle 10.

The elongated control shaft 44 passes through an aperture in a vertical wall of the recess 50 at a location close to the underside of the roof 25 and extends the length dimension of the topper so as to exit through an aperture in a vertical wall of the recess 52 formed proximate the front wall of the topper where it is rotationally journaled in the stationary member 36. Because of the location where the control shaft 44 traverses the length dimension of the topper, it in no way interferes with the ability to load and unload cargo through the swing-up door 30 and which is in covering relation to the control shaft 44 when the door 30 is closed.

With continued reference to FIGS. 5 and 6, it can be seen that the rear and front recesses 50 and 52 include a downward sloping segment 54 and 56 allowing the linkages 41 and the ladder support members 38 and 40 to clear the sidewall 22 of the topper as the ladder support members 38 and 40 carrying a ladder are made to swing down to a position alongside of the sidewall of the topper by rotation of a crank arm joined to the control shaft 44.

The recesses like 50 and 52 may be integrally formed in a molding process commonly used in fabricating fiberglass structures with a gel-coat finish. Alternatively, a cutout may be made in the contour of the topper roof or in the roof of a cargo van to allow separately molded inserts to be affixed in the cutouts and bonded in place. The insert piece will be formed to spatially accommodate the ladder rack components while allowing them to swing the ladder support members 38, 40 from their horizontal disposition atop the roof 25 to a position adjacent a sidewall 22 or 24 of the topper.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself. For example, it is contemplated that the roof structure of most van-style vehicles can be modified to incorporate inserts of a metal or plastic conforming to the shape of the recesses 50, 52, 54, 56 as shown in FIGS. 5 and 6 of the drawings, such that a vehicle roof mounted ergonomic ladder rack can be affixed with a reduced height profile.

What is claimed is:

1. In combination, an automotive work vehicle and a ladder rack for facilitating the loading and unloading of at least one ladder onto and from the roof of the work vehicle,
   a) a ladder rack having a front four-bar linkage assembly and a rear four-bar linkage assembly, each including a stationary bar member, a movable ladder support member and a pair of linkages operatively coupled between the stationary member and the movable ladder support member with an elongated drive shaft extending between and journaled for rotation in the stationary bar member of the front and rear four-bar linkage assemblies and connected to one of the pair of linkages comprising the front and rear four-bar linkage assemblies;
   b) the automotive work vehicle having compartment defined by a front wall, a rear wall, a pair of side walls and a roof supported by the front, rear and side walls; the roof including outwardly and downwardly sloping recesses proximate the front and rear walls and parallel thereto, the recesses having front and rear vertical surfaces joined by a bottom surface;
   c) the stationary bar members of the front and rear four-bar linkage assemblies being affixed to said bottom surfaces of the front and rear recesses, respectively, and with said drive shaft passing through an opening formed in the rear vertical surface of the front recess and an opening formed in the front vertical surface of the rear recess such that the drive shaft extends beneath the roof of the compartment, the combination being such that rotation of the drive shaft in a first direction simultaneously displaces the ladder support members from a location within the recesses to a location alongside one of the compartment's pair of side walls.

2. The combination of claim 1 wherein the ladder rack is at least partially recessed below a major surface of the work vehicle's compartment's roof.

3. The combination of claim 1 wherein the work vehicle comprises one of a pickup truck with a topper unit and a cargo van.

4. The combination of claim 1 and further including a crank joined to the elongated drive shaft.

5. The combination of claim 1 and further including a hydraulic dampener operatively disposed between the stationary bar of one of the front and rear four-bar linkage assemblies and the drive shaft, said hydraulic dampener fitted into one of the front and rear recesses.

6. In a combination of an automotive work vehicle and a ladder rack for facilitating the loading and unloading of at least one ladder onto and from the roof area of the work vehicle where the work vehicle has a compartment defined by a front wall, a rear wall, a pair of opposed side walls and a roof and the ladder rack comprise first and second four-bar linkages, each including a stationary bar, a movable load support bar, a first linkage bar pivotally joined to both the stationary bar and the movable load-support bar, an elongate drive shaft journaled for rotation in the stationary bars of the first and second four-bar linkages, and a second linkage coupling the movable load-support bar to the elongate drive shaft, the improvement comprising;

a) first and second indented, and outwardly and downwardly sloping recesses formed in the roof of the compartment that extend parallel to and proximate the front wall and rear wall, respectively, the stationary bars of the first and second four-bar linkages being contained in the recesses such that the movable load-support bar is at a reduced elevation relative to the compartment's roof when in its load transporting position while allowing the load-support bars of the first and second four-bar linkages to be simultaneously rotated to a position adjacent a side wall of the compartment upon rotation of the elongate drive shaft.

7. The combination of claim 6 wherein the recesses each include a front wall and a rear wall and an outwardly and downwardly sloping floor.

8. The combination of claim 7 wherein the elongate drive shaft extends through an aperture in the rear wall of the recess proximate the front wall of the compartment and through the front wall of the recess proximate the rear wall of the compartment.

\* \* \* \* \*